Figure 1:
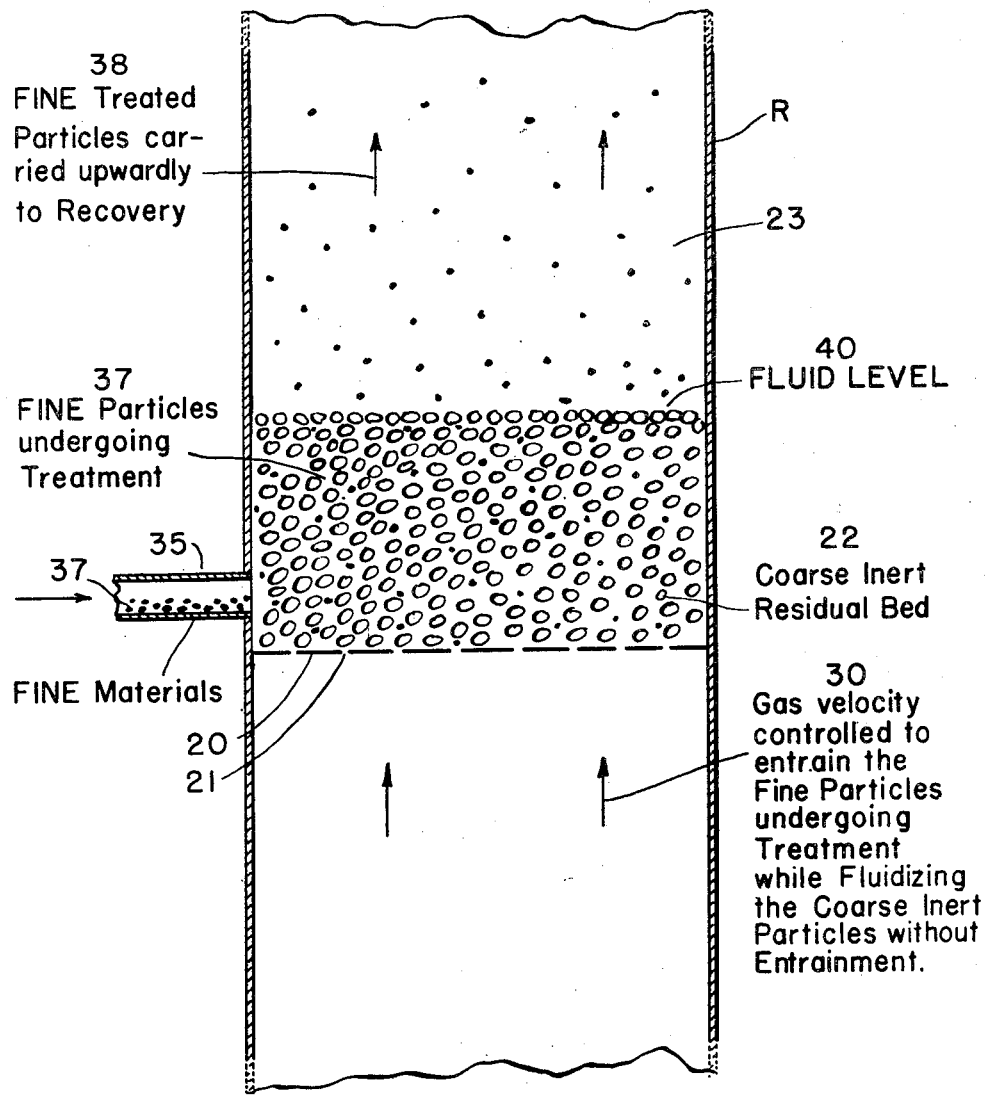

Dec. 18, 1956  F. S. WHITE  2,774,661
METHOD OF HEAT-TREATING FINES IN A COARSE SOLIDS FLUIDIZED BED
Filed Aug. 7, 1951  2 Sheets-Sheet 2

INVENTOR
Frank S. White,
BY
ATTORNEY

United States Patent Office 2,774,661
Patented Dec. 18, 1956

2,774,661

METHOD OF HEAT-TREATING FINES IN A COARSE SOLIDS FLUIDIZED BED

Frank S. White, Stockbridge, Mass., assignor to The Dorr Company, Stamford, Conn., a corporation of Delaware Application August 7, 1951, Serial No. 240,687

5 Claims. (Cl. 75—9)

This invention relates to the heat-treatment of thermally reactive fine solid particles while in the presence of a fluidized mass of incandescent thermally-stable solids. It is particularly adapted for the treatment of compounds such as the carbonates, sulfides, or hydrates of metals; typical materials which can be treated by the practice of this invention include lime-bearing sludges such as paper pulp mill sludge from causticizing operations; water softening sludge; sludge from first carbonation or other lime sludge producing stations in sugar factories; red mud from the Bayer Method of processing bauxite; sulfidic-sulfur bearing metal ores; and so on.

Such thermally-reactive solids are currently roasted or calcined or treated in flash roasters or rotary-type kilns but the expense thereof is high and their operation not particularly efficient or satisfactry, partly because of lack of close temperature control both generally and locally and also due to high fuel consumption and dusty operating conditions. So, it is an object of this invention to overcome the difficulties of these prior methods and achieve efficient heat treatment of fine, thermally-reactive solid particles.

By thermally-reactive solids is meant solid materials which under the influence of heat undergo chemical reactions either by way of decomposition into a gas and a lower molecular-weight derivative of the parent solid or by way of interaction with either gaseous or other solid reactants. A typical reaction of the decomposition reaction is exhibited when calcium carbonate breaks down into calcium oxide and gaseous carbon dioxide. A typical example of interaction with a reactant is exhibited when a sulfidic-ore such as pyrite is roasted in air thereby yielding gaseous sulfur dioxide and iron oxide, or where hematite ($Fe_2O_3$) is reduced to magnetite ($Fe_3O_4$). Other examples will appear to those skilled in the field to which this invention applies.

This patent application is a continuation in part of my patent application Serial No. 101,879, filed June 28, 1949, now abandoned, which in turn is a division of my United States patent application Serial No. 78,569, filed February 26, 1949, now Patent No. 2,650,084 issued August 25, 1953. The latter application is a division of my United States Patent No. 2,465,410, issued March 29, 1949, and filed June 26, 1946. The latter discloses an invention concerning the nodulizing or pelletizing of fine particles of lime-bearing solids while they are being calcined in the presence of a mass of incandescent larger solids maintained fluidized by a stream of gas uprising at solids-fluidizing velocity. By this treatment, the fine calcinable solids are chemically decomposed but also are aggregated to a physical form or size which resists entrainment in the uprising stream of treatment gas. However, in several instances it is desirable to avoid aggregation of the decomposed material yielded during the heat treatment so that the product solids remain in a form of fine sub-division, a condition hereinafter referred to as ultra-fine. Ultra-fine solids often afford processing advantages in their later treatment, for example, in conducting certain chemical reactions including slaking or even in physical mixing. Furthermore, some ultra-fine materials are not fluidizable, i. e. they agglomerate or exhibit tendencies toward accretion during fluidization to an extent which renders continuation of the treatment impractical.

An essential feature of this invention lies in that the heat treatment of the ultra-fine thermally-reactive solids takes place in the presence of a fluidized mass of incandescent coarser but thermally-stable solids that are large enough or heavy enough generally to resist being entrained in the stream of uprising fluidizing gas but yet of a size to be fluidized whereby the ultra-fine solids are thereby briefly exposed to the radiant, conductive and convective heat energy of the fluidized solids and the fluidizing gas surrounding them to an extent that they react as previously described whereupon they are carried out of the place of treatment by entrainment in the uprising gas. By a thermally stable mass of solids is meant a mass of solids in which the larger portion of such solids is not chemically reactive by nature or have already completed the limit of their reaction under condition then existing in the bed. More particularly, this invention resides in correlating the bed depth and the velocity of the gas to control the time of residence of the fine solids in and of their transit through the bed of non-stratified incandescent entrainment-resisting fluidized coarse solids to be such as to complete in a significantly brief interval the desired heat-induced reaction therewith, and forthwith to remove discriminatingly the reacted fines from the bed.

The process of this invention may be best described as an upflow treatment process. That is to say, the ultra-fine solids being treated are introduced into the fluidized bed beneath the surface thereof either by introducing them initially into the bottom of the bed as hereinafter described, or by feeding them onto the top of the inert bed of non-reactive solids to be dispersed throughout such bed for reaction as described in the above mentioned application Serial No. 101,879 of which this application is a continuation-in-part. In such application a preferred form of feeding is disclosed in which wet filter cake lumps are fed to the bed surface, are taken into the turbulent bed, broken up, dispersed, dried and reacted. In any of the above feeding methods, the fines are quickly dispersed then move generaly upwardly through the bed of relatively coarser fluidized solids and are ultimately removed upwardly from the bed as solids entrained in an uprising stream of fluidizing gas.

By the term fluidized is meant the state of dense, liquid-like suspension of solids that occurs when an upflowing stream of gas at certain velocities (which are well known in the art) is passed through a mass of solid particles. A fluidized mass or bed of such solids appears like a boiling liquid; has its solid particles in non-stratifying rapid, turbulent, zig-zag motion; has a substantially uniform temperature or thermal homogeneity prevailing throughout its breadth and depth; and flows under the influence of a fluistatic head. A fluidized bed may be obtained by establishing and maintaining in an enclosing reactor or furnace a mass of fine solids above a gas-permeable plate or partition through which the suspending, fluidizing gas is forced at a velocity through space correlated with the size and the density of the coarser solids in the bed. Known fluidizing space velocities range from as low as 0.2 feet per second to about 20 feet per second.

In this invention, ultra-fine feed solid particles are continually supplied to the bed within the reactor and upon reaction occurring during their brief residence in the fluidized bed are largely swept out of the reactor with the uprising fluidizing gas. This treatment is characterized in that the reactor has present in it that which I refer to as entrainment-resisting coarser thermally-stable solids, namely solids having a grain size lying in a range from about −14 to +65 screen mesh (Tyler) to which are supplied the ultra-fine reactive particles.

Solids of the fluidized bed are maintained at reaction temperatures for endothermic reactions such as the decomposition of calcium carbonate into calcium oxide and gaseous carbon dioxide either by direct combustion of fuel within the bed or by pre-heating the fluidizing gas itself, and in some cases a combination of the above methods may be employed.

When an exothermic reaction, such as the roasting of sulfidic ores, is being carried out, the heat yielded by the reaction will usually be sufficient to maintain reaction temperatures within the bed. In such a case those inert solids in the bed serve as a heat reservoir to supply heat to initiate the reaction and then they reabsorb heat yielded thereby. If the exothermic reaction is not self-supporting, then heat may be added to the bed as in the case of endothermic reactions. On the other hand, if too much heat is yielded then the maximum bed temperature may be controlled by adding water directly to the bed or by supplying relatively cooler inert solids to the bed so that the turbulence of the bed distributes the cooling effect of the coolant materials throughout the bed thus resulting in a uniform controlled temperature within the bed.

It is an essential feature of this invention that the fines undergoing treatment are contacted with the heat containing solids of the fluidized bed for a time sufficient to insure substantial completion of reaction therein. I have found that the contact time of fines within the bed may be controlled by regulating within limits the velocity of the uprising fluidizing gas stream or by regulating the depth of the coarse inert bed through which the fines pass, or by a combination of these steps. Thus a longer contact time for the fines can be attained by decreasing the velocity of the uprising gas stream or by increasing the depth of the bed through which the fines pass. A decreased contact time may be attained either by increasing the velocity of the uprising gas stream or by decreasing the depth of the inert bed or both.

From time to time (or even continually as a part of the feed) some coarse solids which at least upon reaching reaction temperatures are thermally-stable may be added to the bed to make up for any attrition or unavoidable entrainment losses. This fluidized coarse-and-fine bed permits the obtaining of the principal advantages of the fluidizing process, some of which are uniform temperature, surface combustion, intimate gas-solids contact, and rapid heat transfer. Still other advantages and features will appear as this specification proceeds.

As this invention may be embodied in several forms without departing from the spirit or essential characteristics thereof, the present embodiment is therefore illustrative and not restrictive, since the scope of the invention is defined by the appended claims rather than by the description preceding them, all changes that fall within the metes and bounds of the claims, or equivalents of such metes and bounds, are therefore intended to be embraced by the claims.

Figure 2:
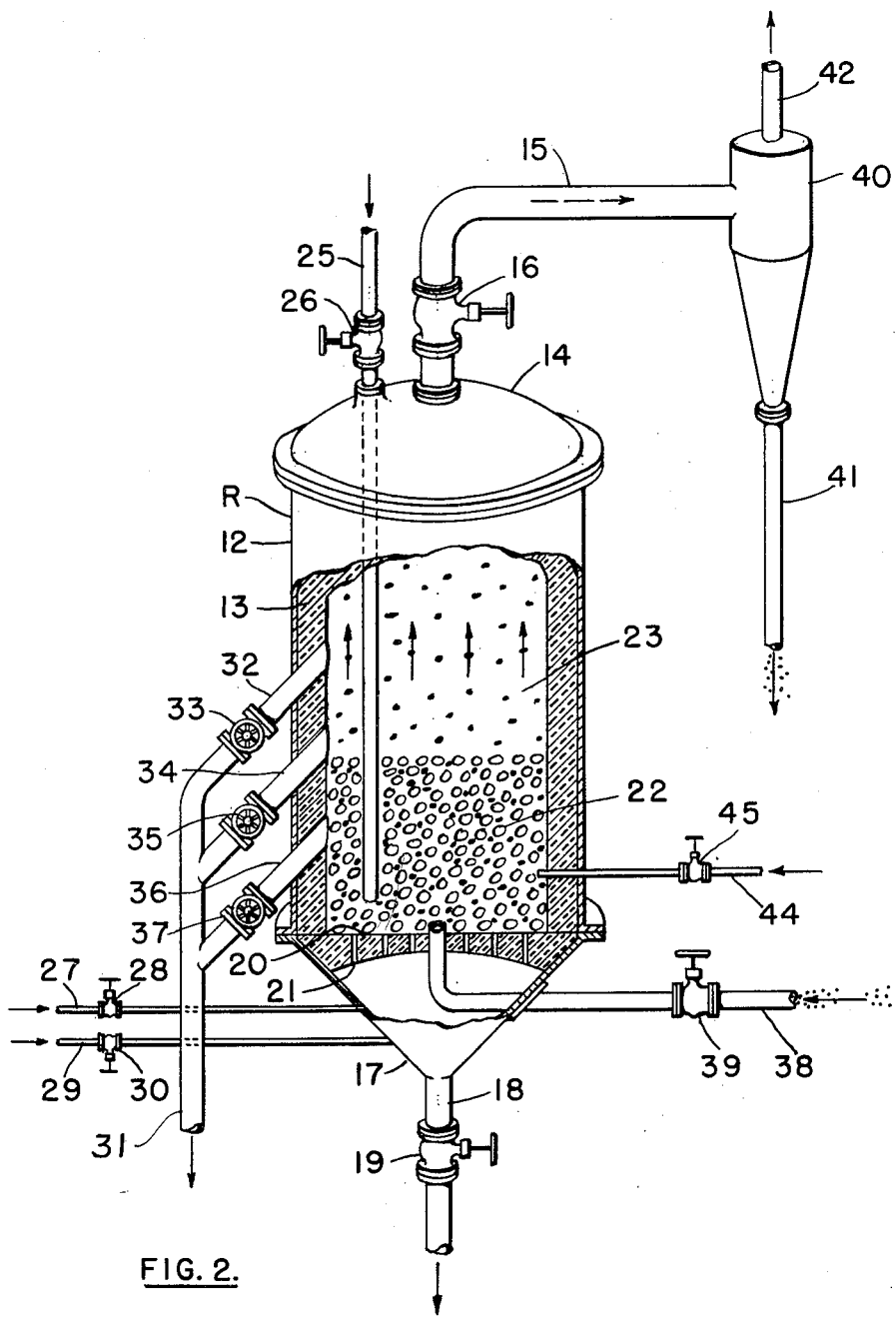

In the drawings, Figure 1 is an idealized partial view showing the operation of this invention. Figure 2 is a cutaway perspective view of a single compartment fluidized solids reactor showing a preferred embodiment of my invention.

In Figure 1 there is shown an enclosed fluidized bed 22 of relatively coarse inert solids above which is a freeboard space 23. The bed rests on a constriction plate 20 which is provided with apertures 21. Fine feed solids enter the bed below the surface or fluid-level 40 thereof through conduit or feed line 35.

Fluidizing gas 30 is passed upwardly through apertures 21 of gas-permeable support plate 20 at a velocity controlled to maintain bed 22 as a turbulently mobilized fluidized bed whereby the coarse solids are maintained as a dense suspension and the entering fine solids are dispersed throughout the bed while being moved generally upwardly through the bed due to the entraining action of the uprising gas stream.

The velocity of the uprising stream of gas is maintained sufficiently low so as to avoid or at least minimize the entrainment of coarse solids.

It can be seen then, that although the entering fines are quickly dispersed throughout the bed and retained therein for a time, nonetheless, the fines exhibit a general upward flow path through the bed and superjacent freeboard space. This upward motion is best described as upflow treatment. That is to say, the particular reaction may be called an upflow roast or an upflow calcination as the case may be.

Figure 2 shows a single compartment fluidized solids reactor suitable for carrying out the process of this invention.

In Figure 2 the reactor R is a vertical cylinder having a metal outer wall 12 and lined with firebrick or refractory material 13. The reactor has a top 14 equipped with a gas-entrained-solids discharge conduit 15 valved as at 16. Top 14 is also provided with a coarse solids inlet conduit 25 valved as at 26. The reactor has a coned bottom 17 equipped with a cleanout conduit 18 which is valved as at 19.

Located in the lower section of the reactor and extending throughout its cross-sectional area is a horizontal plate 20 provided with apertures 21 and adapted to hold a bed 22 of fluidized solids above which is freeboard space 23.

Fluidizing gas is supplied to the reactor via conduit 29 which is equipped with a suitable regulating valve 30. The fluid-level of bed 22 as well as its overlying freeboard space 23 is maintained constant during operation by one or the other of overflow conduits 32, 34 and 36 through which coarse solids flow to leave the reaction chamber. The depth of bed 22 is regulated by means of common discharge conduit 31 and overflow conduits or spill-pipes 32, 34 and 36 which are respectively provided with suitable valves 33, 35 and 37. Thus to maintain the fluid level shown in Figure 2 valves 33 and 37 are closed while valve 35 is open and the solids discharge via conduit 34 into common conduit 31. The variations in bed depth and the consequent variation in the depth of the overlying freeboard provide means for increasing or decreasing the contact time of fines passing through the bed or the time of exposure of the fines to the heat content of the bed.

Fuel for starting up is supplied via conduit 27, valved as at 28, and combusted in a burner not shown. After bed 22 is at a sufficiently elevated temperature to combust fuel therein then valve 28 is closed and fuel is thereafter supplied via conduit 44 and valve 45. If the reaction is exothermic to an extent that no further fuel is required then none is supplied. If the reaction yields too much heat it may be necessary to supply a coolant liquid, such as water through conduit 44 or a similar conduit.

Ultra-fine solids to be treated are introduced into the bottom of bed 22 via conduit 38 and valve 39, such solids being transported from a supply not shown through conduit 38 as gas entrained solids according to well-known methods.

Fine solids pass dispersingly upwardly through bed 22, being retained therein a sufficient time to insure reaction. The treated fines upflow out of bed 22 upwardly through freeboard space 23 and exist from the reactor via conduit 15.

The solids-laden gases enter dust-diminishing station 40 where entrained solids are separated. The separated solids are discharged through tailpipe 41 as product while the gases are discharged via conduit 42 to process, waste or possibly to a further cleaning station for recovery of any remaining entrained solids.

An alternative mode of operation is to introduce a mixture of coarse and fine feed materials through conduit 25. The fines will roast or be otherwise treated as previously described while the coarse will be retained in the bed and when treated will be discharged from the bed via one of the overflow conduits. Thus treated feed solids can make up the inert coarse bed and a feed mixture of coarse and fine solids can be continuously treated at a high unit capacity.

Since this invention is applicable to decomposable solids that yield a gas upon their decomposition, it is apparent that gas passing through and out of the fluidized treatment bed 22 is derived from several sources. These comprise: (a) the excess air and products of combustion streaming up from the bed; (b) reaction gas evolved by the decomposition of the feed solids, and (c) water vapor derived from the initial drying of these solids. No matter what the total volume per unit time of these gases is, it is essential that fluidization velocities be not exceeded. I prefer that the fluidization space velocities lie in a median range, i. e. from about 4 to 18 feet per second. These may be attained in operation by correlation of the solids feed rate in conjunction with the air and fuel input to the reactor R.

An important practical advantage of this invention is the improvement it achieves over a method of fluidization of ultra-fine decomposable solids alone. For example, when processing a fine limestone lying substantially below 200 mesh (Tyler) in size, it is necessary to keep the gas space velocity below 1 foot per second. But since the heat required for the decomposition reaction is derived from a gaseous combustion operation, this means that the allowable gas rate for a given reactor is quite severely limited or curtailed. Thus, to balance the factors of heat input and fluidization gas velocity, the total feed solids rate must be held to a low value. Specifically, when fluidizing by calcining a very fine limestone in the absence of entrainment-resisting coarser thermally-stable solids, I determined that reactor capacity was less than 500 pounds per square foot of cross-section per day. However, when treating that same material in the presence of thermally-stable entrainment-resistant coarser incandescent solids, as taught by this invention, nearly 5,000 pounds per square foot of reactor per day could be fully treated. This is an increase of some 900%. In other words, a reactor one-tenth in size can be made to accomplish the results of a full size reactor. Naturally, the savings in capital cost are very advantageous. This is illustrative of one commercial advantage of this invention whose primary function is to heat treat thermally decomposable fine solids whose time of residence in the bed is short in the presence of thermally-stable larger solids residually in the bed due to their time of residence in the bed being much longer than that of the finer solids. If the coarse residual solids are of the same chemical composition as the treated ultra-fines, decrepitation or breaking down of the coarse solids by attrition does not contaminate the ultra-fines with an unlike substance.

When this invention is employed for the roasting of ores such as prite or other sulfide ores the gases passing through and out of the bed also contain a quantity of sulfur-dioxide gas yielded by the roasting reaction. In general then it must be remembered that the particular reaction being carried out will materially affect the velocities of gases passing through the bed and overlying freeboard, and adjustments must be made in the velocity of the initially supplied fluidizing gas so that its eventual velocity does not exceed the previously mentioned fluidization velocities.

I claim:

1. The continuous process for heat-treating finely-divided thermally reactive solids, which comprises establishing in an enclosed chamber a bed of thermally-stable non-reactive coarse solids at a predetermined temperature of incandescence on a gas-permeable support with a freeboard space overlying the bed, introducing reactive fine solids from an external source into the bed while maintaining the bed as a homogeneous non-stratifying fluidized bed by passing therethrough a gas stream uprising at a velocity sufficient to fluidize both the coarse and fine bed solids as well as to entrain fine solids from the upper surface of the bed but insufficient to entrain coarse solids thereby dispersing such fine solids throughout said fluidized bed, reacting such fine solids during such dispersal, controlling the time of residence of fine solids in the bed to be sufficient to react such fine solids and discharging the reacted fine solids from the bed by entrainment in the uprising gas stream.

2. Process according to claim 1 in which the fine reactive solids are initially introduced into the bed by feeding them while moist onto the surface of such bed.

3. The continuous process for heat-treating finely-divided thermally reactive sulfur-bearing solids, which comprises establishing in an enclosed chamber a bed of thermally-stable non-reactive coarse solids at a predetermined temperature of incandescence on a gas-permeable support with a freeboard space overlying the bed, introducing such reactive fine solids from an external source into the bed while maintaining the bed as a homogeneous non-stratifying fluidized bed by passing therethrough a gas stream uprising at a velocity sufficient to fluidize both the coarse and fine solids as well as to entrain fine solids from the upper surface of the bed but insufficient to entrain coarse solids thereby dispersing such fine solids throughout said fluidized bed, reacting such fine solids during such dispersal, controlling the time of residence of fine solids in the bed to be sufficient to react such fine solids, and discharging the reacted fine solids from the bed by entrainment in the uprising gas stream.

4. Process according to claim 3 in which the uprising gas stream entering the bed contains free-oxygen, and reaction between said oxygen and said fine reactive sulfur-bearing solids is also effected in said bed.

5. Process according to claim 4 in which the fine reactive solids are initially introduced into the bed by feeding them while moist onto the surface of such bed.

References Cited in the file of this patent

UNITED STATES PATENTS

| Number | Name | Date |
| --- | --- | --- |
| 212,508 | Robinson | Feb. 18, 1879 |
| 1,536,702 | Chase et al. | May 5, 1925 |
| 1,984,380 | Odell | Dec. 18, 1934 |
| 2,293,636 | Johnson | Jan. 29, 1946 |
| 2,455,915 | Borcherding | Dec. 14, 1948 |
| 2,465,410 | White | Mar. 29, 1949 |
| 2,497,940 | Hemminger | Feb. 21, 1950 |
| 2,510,823 | Krebs | June 6, 1950 |
| 2,561,396 | Matheson | July 24, 1951 |
| 2,586,818 | Harms | Feb. 26, 1952 |
| 2,595,255 | Holder | May 6, 1952 |
| 2,596,580 | McKay | May 13, 1952 |
| 2,621,118 | Cyr et al. | Dec. 9, 1952 |
| 2,622,970 | Martin | Dec. 23, 1952 |
| 2,638,684 | Jukkola | May 19, 1953 |
| 2,650,084 | White | Aug. 25, 1953 |
| 2,650,159 | Tarr et al. | Aug. 25, 1953 |

FOREIGN PATENTS

| 600,326 | Great Britain | Apr. 6, 1948 |
| --- | --- | --- |

OTHER REFERENCES

Holder: Abandoned application Serial No. 483,597, filed April 19, 1943.

Chemical and Metallurgical Engineering, June 1944, article by Kalbach, pages 94–98.

Chemical Abstracts, 1951, pages 8417–8420. Article by Yagi et al., page 8418.